United States Patent
Lai

(10) Patent No.: US 10,288,486 B2
(45) Date of Patent: May 14, 2019

(54) IMAGE PROCESSING DEVICE AND METHOD

(71) Applicant: Wistron Corp., New Taipei (TW)

(72) Inventor: Chang-Hsin Lai, New Taipei (TW)

(73) Assignee: Winstron Corp., New Taipei (TW)

( * ) Notice: Subject to any disclaimer, the term of this patent is extended or adjusted under 35 U.S.C. 154(b) by 0 days.

(21) Appl. No.: 15/823,468

(22) Filed: Nov. 27, 2017

(65) Prior Publication Data

US 2019/0063998 A1  Feb. 28, 2019

(30) Foreign Application Priority Data

Aug. 23, 2017 (TW) .............................. 106128567 A

(51) Int. Cl.
| | |
|---|---|
| *G01J 5/00* | (2006.01) |
| *G01J 5/08* | (2006.01) |
| *G01J 5/02* | (2006.01) |
| *G02B 13/00* | (2006.01) |

(52) U.S. Cl.
CPC ........... *G01J 5/0806* (2013.01); *G01J 5/0275* (2013.01); *G02B 13/008* (2013.01); *G01J 2005/0081* (2013.01)

(58) Field of Classification Search
CPC ...... H04N 5/23216; H04N 5/33; H04N 5/332; H04N 5/341
See application file for complete search history.

(56) References Cited

U.S. PATENT DOCUMENTS

2008/0099678 A1* 5/2008 Johnson .................... G01J 5/02
 250/332
2014/0267757 A1* 9/2014 Abramson ......... H04N 5/23216
 348/164

FOREIGN PATENT DOCUMENTS

| CN | 105544483 A | 5/2016 |
|---|---|---|
| CN | 105554483 A | 5/2016 |
| TW | 201327266 A1 | 7/2013 |

\* cited by examiner

*Primary Examiner* — Yara B Green

(57) ABSTRACT

An image processing device is provided in the invention. The image processing device includes a main camera, a thermal camera, a G-sensor and a processor. The main camera generates a main image of a scene, wherein the main image has a main-image size. The thermal camera generates a thermal image of the scene, wherein the thermal image has a thermal-image size and the thermal-image size is smaller than the main-image size. The G-sensor generates relative-position information of the main camera and the thermal camera. The processor calculates the offset quantity between the main image and the thermal image, extracts an extracted image from the main image according to the relative-position information, the offset quantity and the thermal-image size, and generates a composite image according to the extracted image and the thermal image.

6 Claims, 6 Drawing Sheets

IMAGE PROCESSING DEVICE AND METHOD

CROSS REFERENCE TO RELATED APPLICATIONS

This application claims priority of TW Patent Application No. 106128567 filed on Aug. 23, 2017, the entirety of which is incorporated by reference herein.

BACKGROUND OF THE INVENTION

Field of the Invention

The invention generally relates to image processing technology, and more particularly, to image processing technology for compensating for the offset which occurs when a main image is overlapped with a thermal image.

Description of the Related Art

As the progress of technology moves forward, electronic devices may be configured with a thermal camera (e.g. an infra-red thermograph camera) in addition to a main camera. Such a thermal camera is not only used to shoot the dynamic/static distribution of temperature to generate a thermal image, but it can also be used to obtain an outline of the scene in the image generated by the main camera. Then, the thermal camera may overlap the thermal image with the outline of the scene to increase the readability of the thermal image.

In an electronic device configured with such two cameras, in order to reduce the offset between the image generated by the main camera and the image generated by the thermal camera, the lens of the main camera may be configured to approach the lens of the thermal camera. However, no matter how close the lens of the main camera is to the lens of the thermal camera, the lens position of the main camera and the lens position of the thermal camera cannot be completely overlapped. Therefore, an offset between the image generated by the main camera and the image generated by the thermal camera certainly exists.

Therefore, using current image overlapping technology on an image generated by a main camera and an image generated by a thermal camera, an obvious error may be generated in the composite image of the image generated by the main camera and the image generated by the thermal camera. Furthermore, when the user holds the electronic device in a different direction, offsets corresponded to the different directions may be generated between the thermal image and the outline of the scene of the main image.

BRIEF SUMMARY OF THE INVENTION

An image processing device and method of compensating for the offset that occurs when a main image is overlapped with a thermal image are provided to overcome the problems mentioned above.

An embodiment of the invention provides an image processing device. The image processing device comprises a main camera, a thermal camera, a G-sensor and a processor. The main camera generates a main image of a scene, wherein the main image has a main-image size. The thermal camera generates a thermal image of the scene, wherein the thermal image has a thermal-image size and the thermal-image size is smaller than the main-image size. The G-sensor generates relative position information of the main camera and the thermal camera. The processor calculates the offset quantity between the main image and the thermal image, extracts an extracted image from the main image according to the relative position information, the offset quantity and the thermal-image size, and generates a composite image according to the extracted image and the thermal image.

In some embodiments of the invention, the processor calculates the offset quantity between the main image and the thermal image according to the distance between the lens of the main camera and the lens of the thermal camera, and the pixel field-of-view (PFOV) of each pixel of the main image.

In some embodiments of the invention, the processor obtains a central point of the extracted image in the main image according to the offset quantity and the relative position information. The processor extracts the extracted image according to the central point and the thermal-image size.

In some embodiments of the invention, before generating the composite image, the processor performs image processing procedures on the extracted image. The processor overlaps the thermal image with the extracted image which has been processed through the image processing procedures to generate the composite image.

An embodiment of the invention provides an image processing method. The image processing method comprises: photographing a scene to generate a main image, wherein the main image has a main-image size by a main camera; photographing the scene to generate a thermal image, wherein the thermal image has a thermal-image size and the thermal-image size is smaller than the main-image size by a thermal camera; obtaining relative position information of the main camera and the thermal camera; calculating the offset quantity between the main image and the thermal image; extracting an extracted image from the main image according to the relative position information, the offset quantity and the thermal-image size; and generating a composite image according to the extracted image and the thermal image.

Other aspects and features of the invention will become apparent to those with ordinary skill in the art upon review of the following descriptions of specific embodiments of methods and devices.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
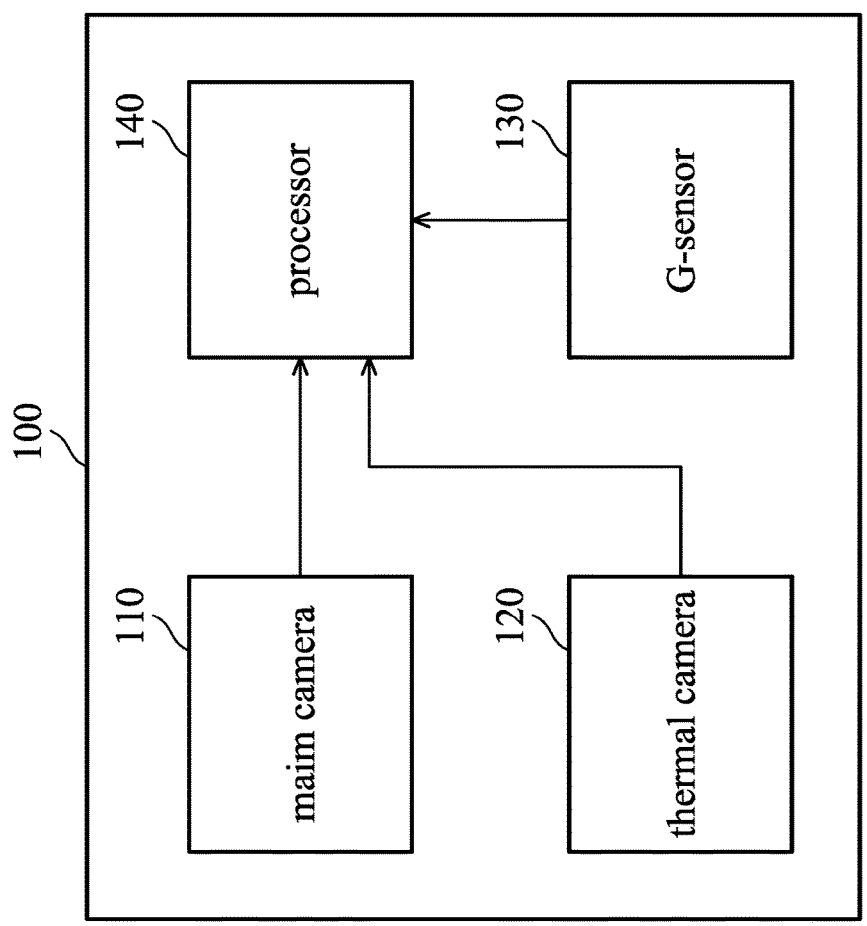
FIG. 1 is a block diagram of an image processing device 100 according to an embodiment of the invention.

FIG. 1 is a block diagram of an image processing device 100 according to an embodiment of the invention. In an embodiment of the invention, the image processing device 100 may be a smartphone or a tablet computer, but the invention should not be limited thereto. As shown in FIG. 1, the image processing device 100 comprises a main camera 110, a thermal camera 120, a G-sensor 130 and a processor 140. FIG. 1 presents a simplified block diagram in which only the elements relevant to the invention are shown. However, the invention should not be limited to what is shown in FIG. 1. The image processing device 100 also can comprise other elements.

In an embodiment of the invention, the main camera 110 may be a general camera with normal photographing function.

In an embodiment of the invention, the thermal camera 120 is an infra-red thermograph camera. The infra-red thermograph camera can transform the radiant energy of the infra-red to the electronic signals, and present the distribution of different temperatures by different colors to generate the thermal images.

Figure 2:
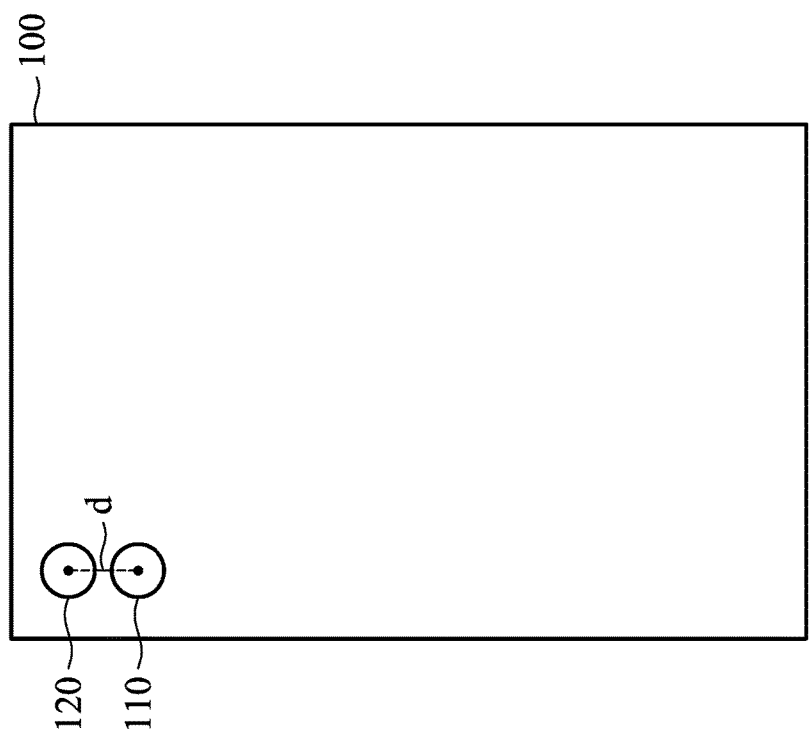
FIG. 2 is a schematic diagram illustrating the configurations of the main camera 110 and the thermal camera 120 according to an embodiment of the invention.

FIG. 2 is a schematic diagram illustrating the configurations of the main camera 110 and the thermal camera 120 according to an embodiment of the invention. As shown in FIG. 2, according to an embodiment of the invention, in the housing of the image processing device, the lens of the thermal camera 120 is configured above the lens of the main camera 110 and the distance between the lens of the main camera 110 and the lens of the thermal camera 120 is d. According to an embodiment of the invention, the processor 140 may obtain the configuration information S1 (e.g. the lens of the thermal camera 120 is configured above the lens of the main camera 110) and the distance information S2 of the main camera 110 and the thermal camera 120 from the main camera 110 and the thermal camera 120. According to an embodiment of the invention, the processor 140 may obtain the configuration information S1 (e.g. the lens of the thermal camera 120 is configured above the lens of the main camera 110) and distance information S2 of the main camera 110 and the thermal camera 120 from a storage device (not shown in figures) of the image processing device. It should be noted that the schematic diagrams of FIG. 2 are only utilized to illustrate the embodiments of the invention. However, the invention should not be limited thereto.

Figure 3:
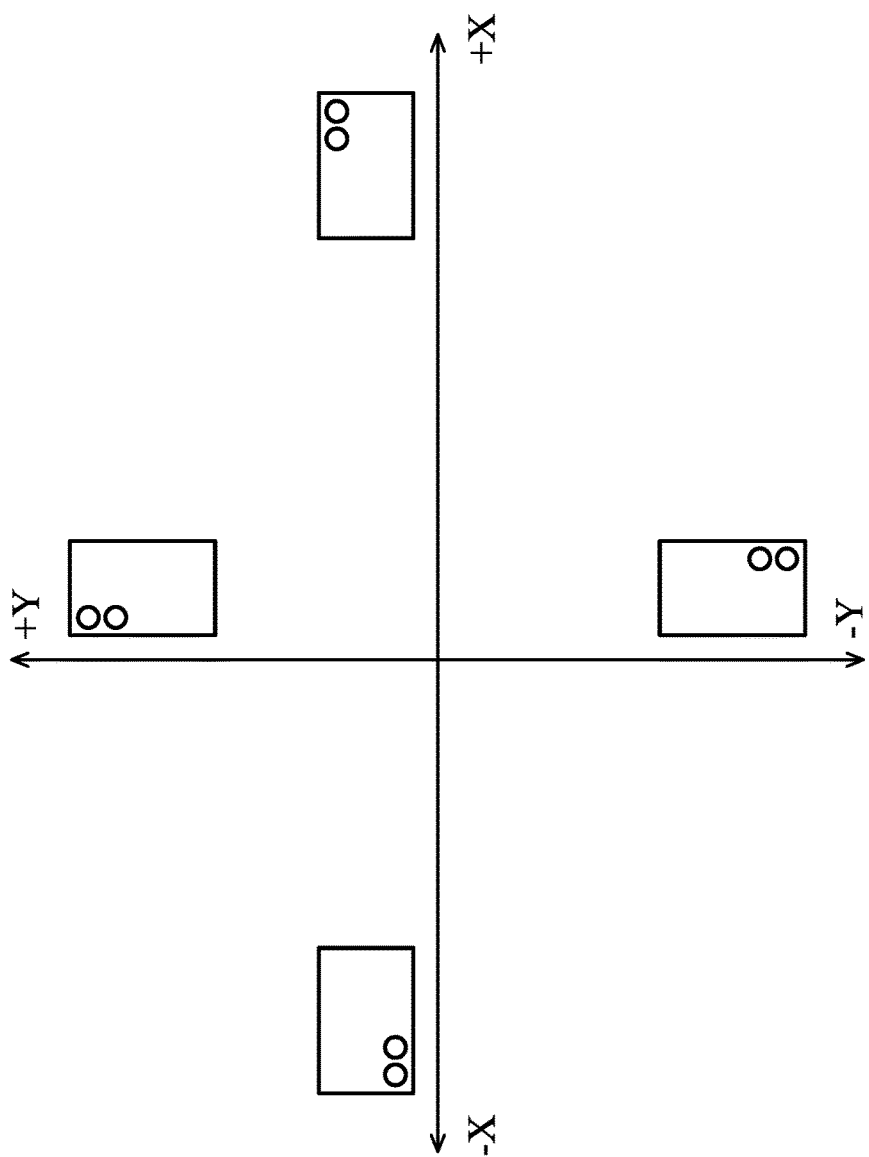
FIG. 3 is a schematic diagram illustrating the holding information S3 related to the current direction of the image processing device 100 is hold according to an embodiment of the invention.

According to an embodiment of the invention, the G-sensor 130 may generate the holding information S3 related to the current holding direction of the image processing device 100 and provide the holding information S3 related to the current holding direction of the image processing device 100 to the processor 140. FIG. 3 is a schematic diagram illustrating the holding information S3 related to the current holding direction of the image processing device 100 according to an embodiment of the invention. As shown in FIG. 3, when the user holds the image processing device 100 in vertical direction, the processor 140 may know the holding direction of the image processing device 100 is +Y or −Y according to the holding information S3. When the user holds the image processing device 100 in horizontal direction, the processor 140 may know the holding direction of the image processing device 100 is +X or −X according to the holding information S3.

According to an embodiment of the invention, the processor 140 may generate the relative position information S4 of the main camera 110 and the thermal camera 120 according to the information S3 related to the current direction of the image processing device 100 is hold and the configuration information S1 of the main camera 110 and the thermal camera 120. Using FIG. 2 and FIG. 3 as an example, if the processor knows that the lens of the thermal camera 120 is configured above the lens of the main camera 110 according to the configuration information S1 and knows the holding direction of the image processing device 100 is +X according to the holding information S3 related to the current direction of the image processing device 100, the processor 140 may generate the relative position information S4 (i.e. the thermal camera 120 is on the right side of the main camera 110) according to the configuration information S1 and the holding information S3 related to the current holding direction of the image processing device 100. Therefore, when the processor 140 may compensate for the offset which is generated because of the distance d between the lens of the main camera 110 and the lens of the thermal camera 120, the processor 140 may know the compensation direction of the image according to the relative position information S4.

According to an embodiment of the invention, when the image processing device is utilized to generate an overlapping (or composite image) of a normal image and a thermal image, the main camera 110 is utilized to photograph a scene to generate a main image I1 and the thermal camera 120 is utilized to photograph the same scene to generate a thermal image I2. According to an embodiment of the invention, the main image I1 has a main-image size, and the thermal image I2 has a thermal-image size. The thermal-image size is smaller than the main-image size.

Figure 4:
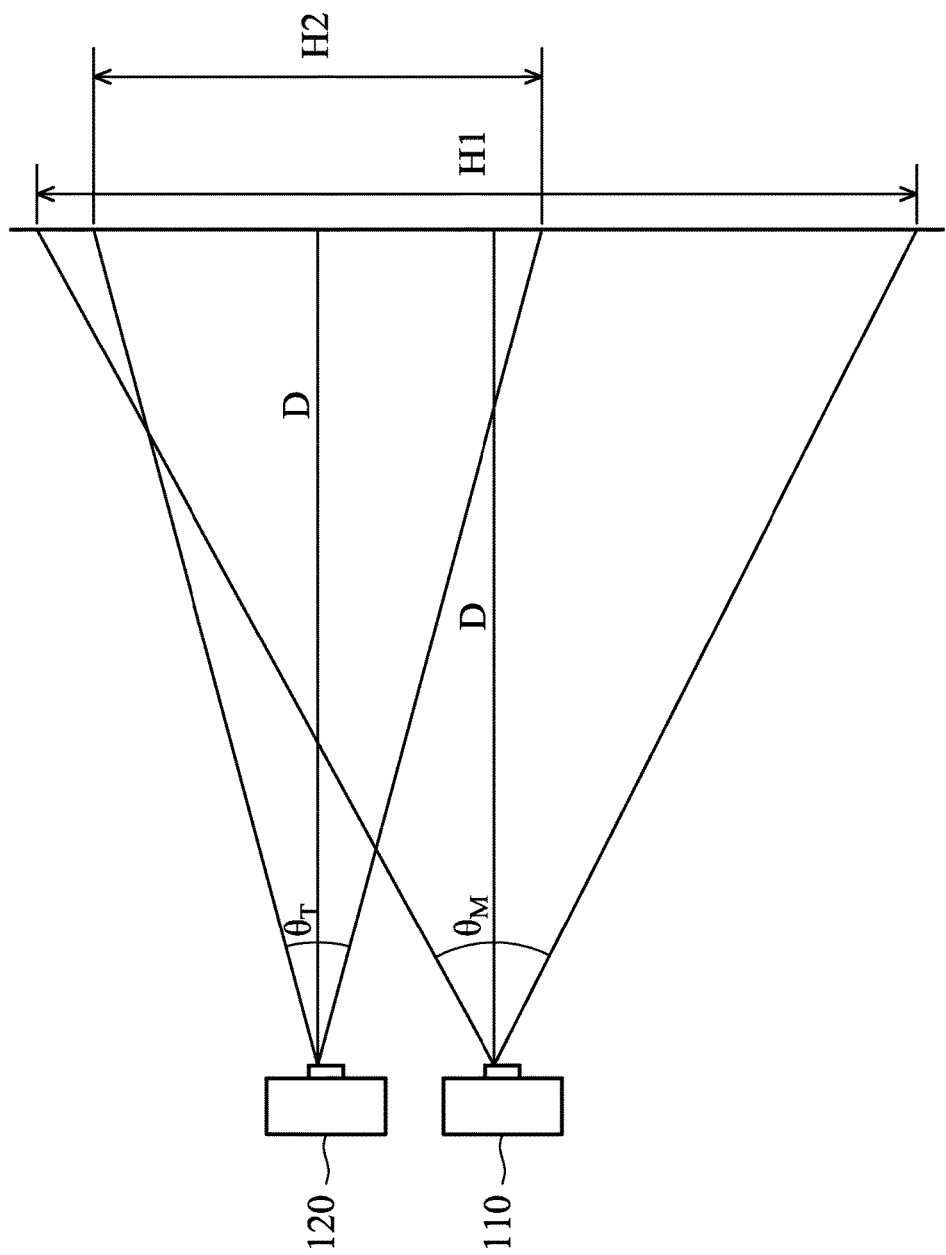
FIG. 4 is a schematic diagram illustrating the height of a main image and the height of a thermal image according to an embodiment of the invention.

According to an embodiment of the invention, the processor 140 may calculate the main-image size according to the field of view (FOV) of the main camera 110 and the distance D between the photographed scene and the image processing device and calculate the thermal-image size according to the FOV of the thermal camera 120 and the distance D between the photographed scene and the image processing device. The FOV of the main camera 110 may cover the FOV of the thermal camera 120. FIG. 4 will be used for illustration below.

According to an embodiment of the invention, the information of the FOV $\theta_M$ of the main camera 110 may be provided to the processor 140 by the main camera 110 and the information of the FOV $\theta_T$ of the thermal camera 120 may be provided to the processor 140 by the thermal camera 120. According to an embodiment of the invention, the processor 140 may calculate the distance D between the photographed scene and the image processing device using a facial recognition algorithm (when the photographed scene is a human face) or an auto-focusing algorithm, but the invention should not be limited thereto. According to an embodiment of the invention, the processor 140 may further obtain the pixel information and aspect-ratio information of the main camera 110 and the thermal camera 120 from the main camera 110 and the thermal camera 120.

FIG. 4 is a schematic diagram illustrating the height of a main image and the height of a thermal image according to an embodiment of the invention. As shown in FIG. 4, if the FOV $\theta_M$ of the main camera 110 is 61.3° and the distance D between the photographed scene and the image processing device is 80 cm, the processor 140 may calculate that the height H1 of the main image I1 is 71.1 cm (i.e. H1=2*D*tan($\theta_M/2$)). Then, if the aspect-ratio of the image generated by the main camera 110 is 4:3, the processor 140 may calculate that the width W1 of the main image I1 is 94.8 cm (i.e. 71.1/3*4). Accordingly, if the FOV $\theta_T$ of the thermal camera 120 is 44.5° and the distance D between the photographed scene and the image processing device is 80 cm, the processor 140 may calculate that the height H2 of the thermal image I2 is 49.1 cm (i.e. H2=2*D*tan($\theta_T/2$)). Then, if the aspect-ratio of the image generated by the thermal camera 120 is 4:3, the processor 140 may calculate that the width W2 of the thermal image I2 is 94.8 cm (i.e. 49.1/3*4).

According to an embodiment of the invention, the processor 140 may calculate a pixel FOV (PFOV) of each pixel of the main image I1 according to the pixel information of the main camera 110 and the size of the main image I1 generated by the main camera 110. Using FIG. 4 as an example, if the pixel information of the main camera 110 is 4160*3120 and the size of the main image I1 is 94.8*71.1, the processor 140 may calculate that the PFOV of each pixel of the main image I1 is 0.023 cm (i.e. 94.8/4160).

According to an embodiment of the invention, after obtaining the PFOV of each pixel of the main image I1, the processor 140 may calculate the offset quantity $P_{shift}$ according to the distance information S2 (i.e. distance d between the lens of the main camera 110 and the lens of the thermal camera 120) of the main camera 110 and the thermal camera 120 and the PFOV of each pixel of the main image I1. The calculation of offset quantity $P_{shift}$ is as follows:

$$P_{shift}=d/\text{PFOV}$$

For example, if the distanced between the lens of the main camera 110 and the lens of the thermal camera 120 is 1.2 cm and the PFOV of each pixel of the main image I1 is 0.023 cm, the processor 140 may calculate that the offset quantity $P_{shift}$ is 52 pixels. After obtaining the offset quantity $P_{shift}$, the processor 140 may compensate for the offset which is generated because of the distance d between the lens of the main camera 110 and the lens of the thermal camera 120 according the offset quantity $P_{shift}$. Details are illustrated below.

Figure 5:
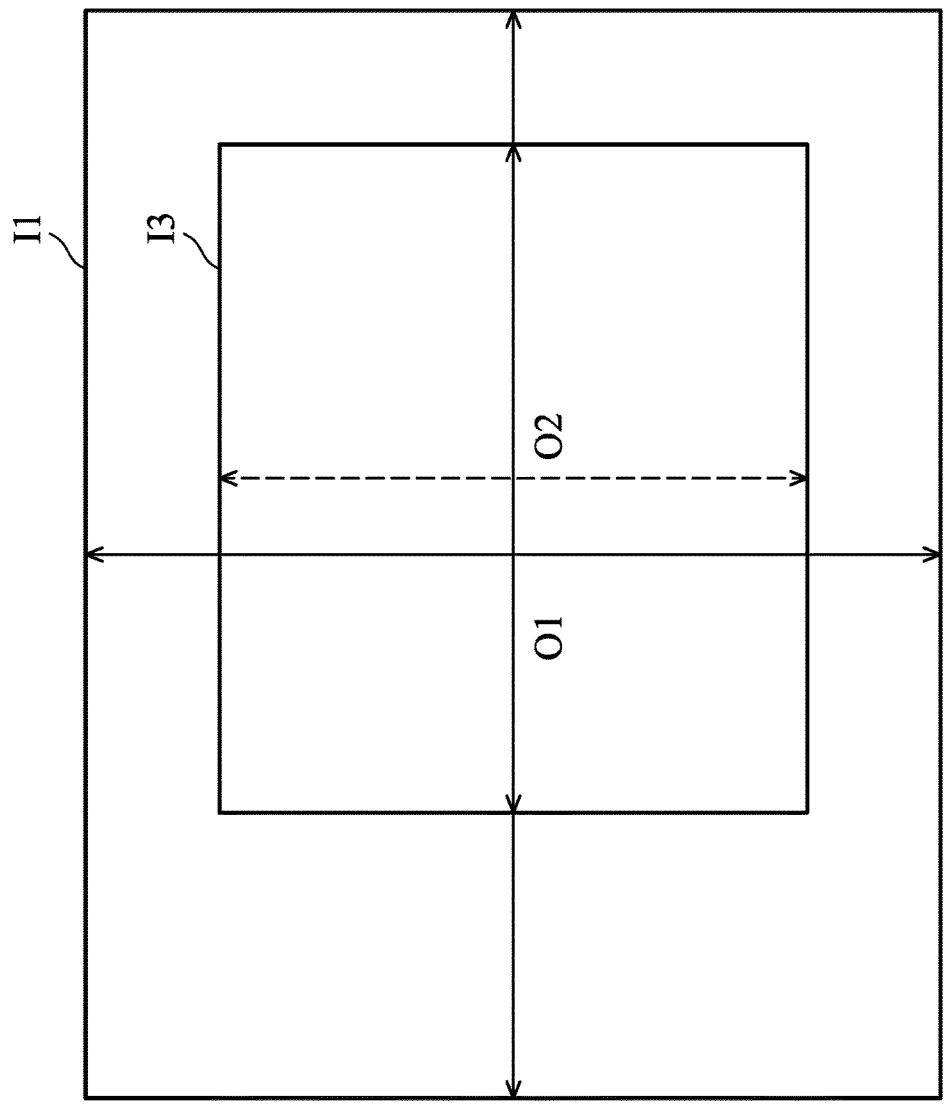
FIG. 5 is a schematic diagram illustrating a central point of the extracted image according to an embodiment of the invention.

According to an embodiment of the invention, the processor 120 may obtain a central point corresponding to an extracted image I3 from the main image I1 according to the offset quantity $P_{shift}$ and the relative position information S4. The extracted image I3 can be regarded as an overlapping part between the main image I1 and the thermal image I2 in the main image I1. In traditional technology, the central point of the main image I1 is used as the central point of the extracted image I3. As a result, when a conventional image composition is performed, the accuracy of the composite image will be affected by the offset which is generated because of the distance d between the lens of the main camera 110 and the lens of the thermal camera 120. Therefore, in the embodiments of the invention, the processor 120 can compensate for the offset by obtaining the central point of the extracted image I3 from the main image I1 according to the offset quantity $P_{shift}$ and the relative position information S4. Using FIG. 5 as an example, after the compensation, the central point of the extracted image I3 will be shifted from the central point O1 of the main image I1 to the central point O2.

According to an embodiment of the invention, when the processor 120 obtains the central point of the extracted image I3, the processor 120 may calculate how many pixels of the thermal image I2 really correspond to the main image I1 (i.e. the pixels to which the thermal-image size corresponds in the main image I1) according to the size of the thermal image I2 and the PFOV of each pixel of the main image I1. For example, if the size of the thermal image I2 is 65.5*49.1 (i.e. the height is 49.1 cm and the width is 65.5 cm) and the PFOV of each pixel of the main image I1 is 0.023 cm, the processor 120 may calculate the real pixels of the thermal image I2 corresponding to the main image I1, i.e. the width of the thermal image I2 corresponds to 2847 (65.5/0.023) pixels and the height is 1821 of the thermal image I2 corresponds to (49.1/0.023) pixels. After obtaining the real size of the thermal image I2 corresponding to the main image I1, the processor 120 may extract the extracted image I3 from the main image I1 according to the central point corresponding to the extracted image I3 and the real size of the thermal image I2 corresponding to the main image I1. According to an embodiment of the invention, the processor 120 comprises an image extracting unit (not shown in figures), and the processor 120 may extract the extracted image I3 from the main image I1 using the image extracting unit.

According to an embodiment of the invention, when the processor 120 extracts the extracted image I3 from the main image I1, the processor 120 may perform image processing procedures on the extracted image I3. For example, the processor 120 may perform the gray-level procedure for the extracted image I3 and perform the operation of reducing the noise of the extracted image I3, and the processor 120 may obtain the outline of the scene of the extracted image I3 through the Canny algorithm (i.e. Canny edge detector). According to an embodiment of the invention, the processor 120 comprises an image processing unit (not shown in figures), and the processor 120 may perform image processing using the image processing unit.

According to an embodiment of the invention, the processor 120 may overlap the thermal image I2 with the extracting image I3 which has been processed through the image processing procedures, to generate the composite image I4. According to an embodiment of the invention, the processor 120 comprises an image composition unit (not shown in figures), and the processor 120 may perform the image composition process using the image composition unit.

Figure 6:
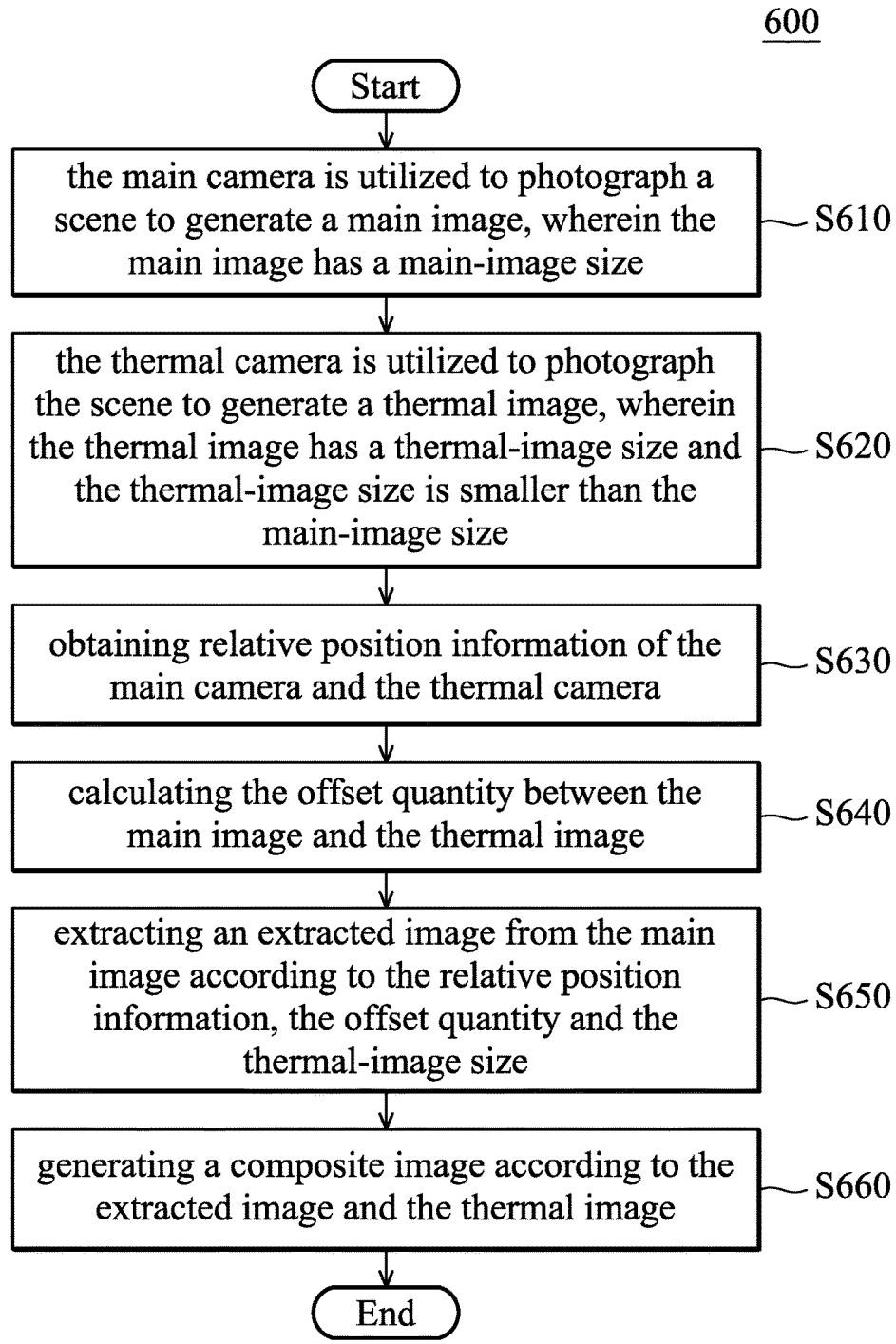
FIG. 6 is a flow chart 600 illustrating an image processing method according to an embodiment of the invention.

FIG. 6 is a flow chart 600 illustrating an image processing method according to an embodiment of the invention. The image processing method is applied to the image processing device 100. As shown in FIG. 6, in step S610, the main camera of the image processing device is utilized to photograph a scene to generate a main image, wherein the main image has a main-image size. In step S620, the thermal camera of the image processing device is utilized to photograph the scene to generate a thermal image, wherein the thermal image has a thermal-image size and the thermal-image size is smaller than the main-image size. In step S630, the image processing device 100 obtains relative position information of the main camera and the thermal camera. In step S640, the image processing device 100 calculates the offset quantity between the main image and the thermal image. In step S650, the image processing device 100 extracts an extracted image from the main image according to the relative position information, the offset quantity and the thermal-image size. In step S660, the image processing device 100 generates a composite image according to the extracted image and the thermal image.

According to some embodiments of the invention, in step S640, the image processing device 100 calculate the offset quantity between the main image and the thermal image according to the distance between the lens of the main camera and the lens of the thermal camera and the PFOV of each pixel of the main image.

According to some embodiments of the invention, in step S650, the image processing device 100 may obtain a central point of the extracted image in the main image according to the offset quantity and the relative position information and extract the extracted image according to the central point and the thermal-image size. In the embodiments of the invention, the image processing device 100 may first calculate how many pixels of the thermal image really correspond to the main image (i.e. the pixels to which the thermal-image size corresponds in the main image) according to the thermal-image size and the PFOV of each pixel of the main image. Then, the image processing device 100 may extract the extracted image according to the central point corresponding to the extracted image and the real pixels of the thermal image corresponding to the main image.

According to some embodiments of the invention, in the image processing method, before generating the composite image, the image processing device 100 may perform image processing of the extracted image. Then, the image processing device 100 may overlap the thermal image with the extracting image which has been processed through the image processing, to generate the composite image.

According to the image processing method of the invention, when the thermal image is overlapped with the main image, the offset which is generated because of the distance between the lens of the main camera and the lens of the thermal camera can be compensated for.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An image processing device, comprising:
a main camera, generating a main image of a scene, wherein the main image has a main-image size;
a thermal camera, generating a thermal image of the scene, wherein the thermal image has a thermal-image size and the thermal-image size is smaller than the main-image size;
a G-sensor, generating relative position information of the main camera and the thermal camera; and
a processor, calculating an offset quantity between the main image and the thermal image, extracting an extracted image from the main image according to the relative position information, the offset quantity and the thermal-image size, and generating a composite image according to the extracted image and the thermal image,
wherein the processor calculates the offset quantity between the main image and the thermal image according to the distance between a lens of the main camera and a lens of the thermal camera, and a pixel field-of-view (PFOV) of each pixel of the main image,
wherein the processor obtains a central point of the extracted image in the main image according to the offset quantity and the relative position information,
wherein the processor extracts the extracted image according to the central point of the extracted image and the thermal-image size.

2. The image processing device of claim 1, wherein before generating the composite image, the processor performs an image processing procedure on the extracted image.

3. The image processing device of claim 2, wherein the processor overlap the thermal image with the extracted image which has been processed through the image processing procedure to generate the composite image.

4. An image processing method, comprising:
using a main camera to photograph a scene to generate a main image, wherein the main image has a main-image size;
using a thermal camera to photograph the scene to generate a thermal image, wherein the thermal image has a thermal-image size and the thermal-image size is smaller than the main-image size;
obtaining relative position information of the main camera and the thermal camera;
calculating an offset quantity between the main image and the thermal image according to the distance between the lens of the main camera and the lens of the thermal camera, and the pixel field-of-view (PFOV) of each pixel of the main image;

obtaining a central point of the extracted image in the main image according to the offset quantity and the relative position information;

extracting an extracted image from the main image according to the central point and the thermal-image size; and generating a composite image according to the extracted image and the thermal image.

5. The image processing method of claim 4, further comprising:

performing an image processing procedure on the extracted image before generating the composite image.

6. The image processing method of claim 5, further comprising:

overlapping the thermal image with the extracted image which has been processed through the image processing procedure to generate the composite image.

* * * * *